(12) United States Patent
Halpin, Jr. et al.

(10) Patent No.: US 10,282,357 B1
(45) Date of Patent: May 7, 2019

(54) DYNAMIC RESAMPLING FOR RANKING VIEWER EXPERIENCES

(71) Applicant: Google Inc., Mountain View, CA (US)

(72) Inventors: William Martin Halpin, Jr., Palo Alto, CA (US); Ruixue Fan, Great Neck, NY (US); Antonella Pavese, Seattle, WA (US); Harrison Mark Gordon, Mountain View, CA (US); Kirsten Paige Yee, Mountain View, CA (US); Yueqing Wang, San Francisco, CA (US); Matthew Strecker Burriesci, Half Moon Bay, CA (US); Sean Patrick Miller, Sunnyvale, CA (US); Yijia Feng, Basking Ridge, NJ (US); James Robert Koehler, Boulder, CO (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 15/255,367

(22) Filed: Sep. 15, 2016

(51) Int. Cl.
*G06F 17/30* (2006.01)
*G06F 16/2457* (2019.01)
*G06F 16/93* (2019.01)
*G06F 16/23* (2019.01)
*G06F 16/9535* (2019.01)

(52) U.S. Cl.
CPC .... *G06F 16/24578* (2019.01); *G06F 16/2379* (2019.01); *G06F 16/93* (2019.01); *G06F 16/9535* (2019.01); *G06F 17/30011* (2013.01); *G06F 17/3053* (2013.01); *G06F 17/30377* (2013.01); *G06F 17/30867* (2013.01)

(58) Field of Classification Search
USPC ........................................................ 707/732
See application file for complete search history.

(56) References Cited

U.S. PATENT DOCUMENTS

2009/0222416 A1   9/2009   Tymoshenko et al.
2015/0127565 A1*  5/2015   Chevalier .............. G06Q 10/00
                                                       705/319

FOREIGN PATENT DOCUMENTS

WO    WO-2015/001771 A1    1/2015

OTHER PUBLICATIONS

Forrest, Conner., How the Grid uses AI to revolutionize web design, TechRepublic.com, Jul. 17, 2015.
(Continued)

*Primary Examiner* — Hung T Vy
(74) *Attorney, Agent, or Firm* — Foley & Lardner LLP

(57) ABSTRACT

Methods and systems of reducing computer resource utilization to update rankings based on dynamically generated content are described. The method includes identifying a ranking of content experience types of a list of content experience types. Each content experience type including parameters to generate content experience documents. The method also includes updating the ranking of content experience types. The updating includes iteratively selecting content experience types from the ranking of content experience types to generate an update subset of the ranking of content experience types, generating, for a client device, a feedback request document including a plurality of content experience documents, and receiving feedback information related to the plurality of content experience documents included in the feedback request document to update the ranking of the content experience types included in the update subset.

20 Claims, 15 Drawing Sheets

(56) References Cited

OTHER PUBLICATIONS

Random Startup Website Generator randomly generates websites parodying startup websites, including randomly generated and randomly placed content. Available at: http://tiffzhang.com/startup/.
Usability Sciences. Performs user feedback research for a fee. Rapid iterative testing program involves presenting users with content in a research environment, receiving feedback, fixing identified problems, then re-testing. Available at: http://www.usabilitysciences.com/services/lab-based-usability-testing/rapid-iterative-testing.
Zhang et al. Automatic Generation of Combinatorial Test Data, Springer, Sep. 15, 2014, p. 28-29.

* cited by examiner

310

| | First-party Content Media Type | Media Type | Size | Autoplay | Hyperlink |
|---|---|---|---|---|---|
| CET 1 | 4 | 2 | 3 | 0 | 1 |
| CET 2 | 4 | 2 | 1 | 0 | 1 |
| CET 3 | 4 | 4 | 3 | 2 | 1 |

Legend:

Media types: 1 = image, 2 = video, 3 = audio, 4 = text
Sizes: 1 = up to 400 total pixels, 2 = between 401 and 1000 total pixels, 3 = between 1001 and 3000 total pixels
Autoplay: 0 = no, 1 = yes, 2 = not applicable
Hyperlink: 0 = no, 1 = yes, 2 = not applicable

FIG. 3

FIG. 8 introduction page

Study Overview

During the study you will read articles and answer questions about your experience. Some webpages will have ads, and we might ask questions about them.

Webpage A

DYNAMIC RESAMPLING FOR RANKING VIEWER EXPERIENCES

BACKGROUND

Information resources, such as webpages and pages of mobile applications, can include both first-party content items and third-party content items. First party content items or primary content is content that is provided by a first party content provider. Third-party content items, such as online advertisements may be displayed with the first-party content items. In some embodiments, third-party content items can be inserted in third-party content slots that are positioned on the information resource. The layout, arrangement, and selection of third-party content items displayed in an information resource can contribute to a viewer's viewing experience of the information resource.

SUMMARY

At least one implementation is directed to a method of reducing computer resource utilization to update rankings based on dynamically generated content. The method includes identifying, by one or more servers, a ranking of content experience types of a list of content experience types including a plurality of content experience types. Each content experience type includes one or more parameters to generate content experience documents. The method also includes updating, by the one or more servers, the ranking of content experience types. The updating step includes iteratively: i) selecting, by the one or more servers, content experience types from the ranking of content experience types to generate an update subset of the ranking of content experience types, each content experience type included in the update subset selected such that a number of content experience types ranked between the highest ranked content experience type of the update subset and the lowest ranked content experience type of the update subset is less than a predetermined update threshold, the predetermined update threshold based on a number of content experience types included in the list of content experience types; ii) receiving, by the one or more servers, from a client device, a request to transmit a feedback request document to evaluate rankings of the content experience types included in the update subset; iii) identifying, by the one or more servers, an identifier of the client device to which to provide the feedback request document; iv) generating, by the one or more servers, for the client device, the feedback request document including a plurality of content experience documents, each content experience document of the plurality of content experience documents corresponding to a different content experience type of the update subset, each content experience document generated in accordance with the parameters of the respective content experience type and using information associated with the identifier of the client device; v) transmitting, by the one or more servers to the client device, the feedback request document, the feedback request document including one or more actionable objects to receive feedback information from the client device based on the content experience documents included in the feedback request document; and vi) receiving, by the one or more servers, responsive to transmitting the feedback request document, feedback information related to the plurality of content experience documents included in the feedback request document, the feedback information used to update the ranking of the content experience types included in the update subset.

At least one implementation is directed to a system of reducing computer resource utilization to update rankings based on dynamically generated content. The system includes at least one processor and memory storing computer-executable instructions, which when executed by the processor, cause the processor to identify a ranking of content experience types of a list of content experience types including a plurality of content experience types. Each content experience type includes one or more parameters to generate content experience documents. The processor is further configured to update the ranking of content experience types. The processor is configured to iteratively i) select content experience types from the ranking of content experience types to generate an update subset of the ranking of content experience types, each content experience type included in the update subset selected such that a number of content experience types ranked between the highest ranked content experience type of the update subset and the lowest ranked content experience type of the update subset is less than a predetermined update threshold, the predetermined update threshold based on a number of content experience types included in the list of content experience types; ii) receive, from a client device, a request to transmit a feedback request document to evaluate rankings of the content experience types included in the update subset; iii) identify an identifier of the client device to which to provide the feedback request document; iv) generate, for the client device, the feedback request document including a plurality of content experience documents, each content experience document of the plurality of content experience documents corresponding to a different content experience type of the update subset, each content experience document generated in accordance with the parameters of the respective content experience type and using information associated with the identifier of the client device; v) transmit, to the client device, the feedback request document, the feedback request document including one or more actionable objects to receive feedback information from the client device based on the content experience documents included in the feedback request document; and vi) receive, responsive to transmitting the feedback request document, feedback information related to the plurality of content experience documents included in the feedback request document, the feedback information used to update the ranking of the content experience types included in the update subset.

BRIEF DESCRIPTIONS OF THE DRAWINGS

The details of one or more implementations are set forth in the accompanying drawings and the description below. Other features, aspects, and advantages of the disclosure will become apparent from the description, the drawings, and the claims, in which:

FIGS. 2A-2C are depictions of implementations of a content experience type ranking being generated and updated.

FIG. 3 depicts an implementation of a data structure representing a parametrized content experience type.

FIGS. 8-14 are screenshots of pages of an implementation of a feedback request document.

Figure 1A:
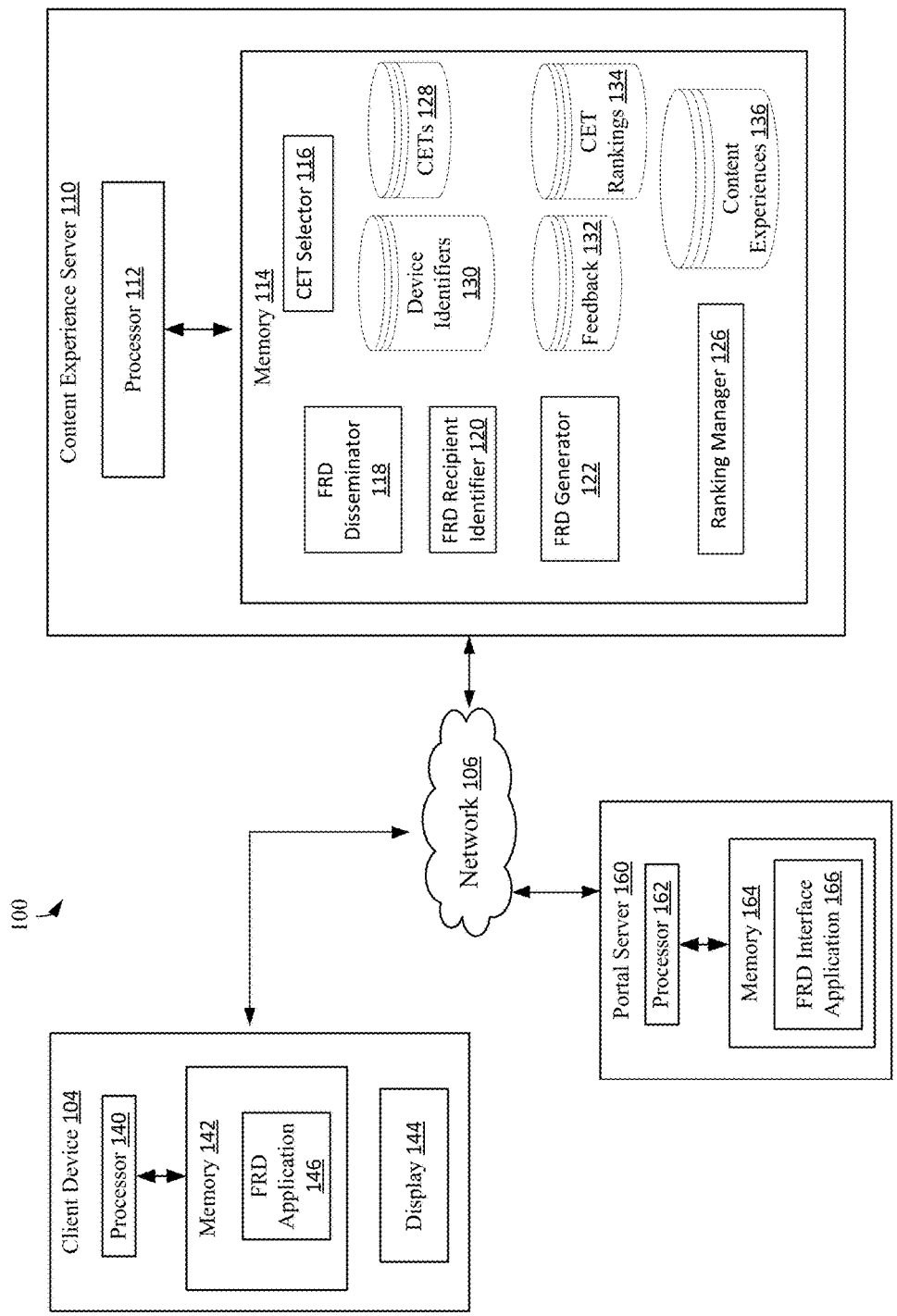
FIG. 1A is a block diagram illustrating an implementation of a system for updating a ranking of content experience types.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The type of content displayed and the format in which the content is displayed on an information resource has a significant effect on a viewer's experience with the information resource. As such, content publishers expend significant time and resources on designing each information resource. When an information resource of a content publisher includes a content slot that is configured to cause the viewer's device to request content from a third-party content server (not the server from which the information resource is accessed), the content publisher no longer has control over what content item the third-party content server will provide for display on the information resource. As a result, even though a content publisher can tweak the format or layout of a webpage to improve the viewer's experience, the content publisher's ability to improve the viewer's experience is limited due to the content publisher's inability to select the third-party content item provided for display with the primary content on the information resource of the content publisher. In short, the viewer's experience with an information resource can be affected by the third-party content server's selection of content.

The selected content item can adversely affect a viewer's experience in many different ways. For instance, the inclusion of the selected content item can interfere with the performance (latency, lag, among others) of the computing device. The inclusion of the selected content item can be based on a browsing history of the viewer and as such, selection of certain content items that are related to the viewer's browsing history can affect the viewer's experience. In addition, if the primary content of the information resource is a video clip with audio and the selected content item is also a video clip with audio and both the primary content and the selected content item begin to play at the same time, the viewer's experience is likely to be adversely affected.

To improve the selection of content by a content selection server, the content selection server or another server can perform one or more experiments to identify content selection parameters that improve a viewing experience of a viewer. A content experience server can generate one or more content experience documents that include one or more content items. The content experience server can then distribute the generated content experience documents to a plurality of viewers and receive feedback. The content experience server can then analyze the feedback to determine the effect of one or more of the content selection parameters on the viewing experience of the viewers. Each of the content experience documents generated by the content experience server can be based on one or more content experience parameters that define a respective content experience type. In this way, the content experience server can generate a plurality of content experience documents having different content items and each of the plurality of content experience documents can still belong to the same content experience type.

One example of a content experience type can be any content experience document that includes a first content item that includes an article with three paragraphs and a second content item that is positioned between the second and third paragraphs. Another content experience type can be any content experience document that uses a short term browsing history (for instance, last 5 minutes) of a viewer to select a content item in the content experience document. Another content experience type can be any content experience document that uses a cookie of a viewer or data related to a sign-in to an account or profile of the viewer to select a content item in the content experience document. It should be appreciated that each content experience parameters can have a plurality of values and each content experience type can be based on one or more values of respective content experience parameters. For instance, the content experience parameter can be browsing history and the value of the browsing history can be 5 minutes. Similarly, another content experience parameter can be a location of a content item and the value can be between a second and third paragraph of a primary content item.

The present solution is directed towards generating content experience documents and receive feedback corresponding to the viewer experiences of the generated content experience documents. The present solution is also directed to generating a ranking of content experience types according to which the content experience documents are generated based on the received feedback. The present solution is also directed to updating the ranking of the generated content experience types to identify content experience types that correspond to positive viewer experiences. The present solution is further directed to analyzing the content experience parameters that are included in the content experience types that correspond to positive viewer experiences to identify values of the content selection parameters for selecting content and generating content experiences that correspond to positive viewer experiences.

A viewer viewing a content experience document may be said to have a viewing experience with the content experience document and the viewing experience may be of a certain quality. An attempt may be made to quantify the viewing experience. As described herein, viewing experiences can be affected by the quality of content, layout, browser compatibility, or other factors intrinsic to first-party content items included in the content experience document. Viewing experiences can also be affected by factors of third party content items, as well as the content selection, latency, or ratio of first and third party content items included in the content experience document. Furthermore, different feelings such as distraction, annoyance, or uneasiness may all contribute to the viewer's individual viewing experience quality, meaning that different metrics may be needed to measure the viewing experience. Because of this complexity, it may be difficult to get a viewer to quantify their experience on a single quality scale. This can make it difficult to compare different content experience documents relative to each other or to rank them, and this in turn can make it difficult to compare different content experience types ("CET"s) relative to each other.

A CET can include one or more rules for generating a content experience document. Each rule can correspond to one or more content selection parameters. In some implementations, each rule can include one or more values corresponding to one or more content selection parameters. In some implementations, each CET can include at least one rule relating to a layout of the content items for generating content experience documents. In some implementations, each CET can include at least one rule relating to a file type of the content items for generating content experience documents. In some implementations, each CET can include at least one rule relating to visual features of the content items for generating content experience documents. In some implementations, each CET can include at least one rule for selecting content items for generating content experience documents. For instance, the rule for selecting content items can be based on a size of the content slot in which the content item is to be inserted, a browsing history value according to which the content items are selected, among others.

In some implementations, a CET may be defined by one or more characteristics of a first-party content item or of a third-party content item, or a characteristic of a combination of the two, included in a content experience. In some implementations, a CET may be defined by one or more characteristics of third-party content items such as a media type (for example, audio, video, text, image, or a combination of these), a file type, a playtime length or range of playtime lengths, whether the media is autoplay, whether a hyperlink is included, a size of the third party content item when displayed, how many third party items of content are displayed, or any other characteristic of a third-party content item. A CET can also be defined by one or more characteristics of first-party content items, such as the characteristics described above, or any other characteristic of a first-party content item. A CET may also be defined by one or more characteristics that involve both first-party content items and third-party content items, such as size of a third-party content item relative to a first party content item, placement of a third-party content item within or on top of a first-party content item, audio volume of a third-party content item relative to an audio volume of a first-party content item, or any other characteristic that involves both first-party content items and third-party content items.

Stated in another way, a content experience type may correspond to a content experience policy that includes one or more rules for generating content experience documents that belong to the content experience type. For instance, the content experience policy can include a first rule that the first-party content item is an article comprising at least 2 paragraphs and the third-party content item is to be a static image ad and a second rule that the third-party content item is to be positioned between a first paragraph and a second paragraph of the first-party content item. As such, any content experience that fulfills these two rules of the content experience policy may be identified as belonging to this particular content experience type. Similarly, other content experience types may correspond to different content experience policies.

In an effort to improve viewing experiences of viewers, there is a desire to better understand which content experience types particular viewers enjoy and which content experience types are generally preferred. In this way, content publishers can generate and deliver content experience documents to viewers that correspond to content experience types that have been identified as more enjoyable. The present solution aims to compare different experience types to generate a ranking of content experience types in accordance to various viewer metrics. The present disclosure further describes methods and systems for iteratively updating a ranking of CETs based on received feedback data from a plurality of viewers.

Following below are more detailed descriptions of various concepts related to, and implementations of, methods, apparatuses, and systems for iteratively updating a ranking of content experience types of a list of content experience types. The various concepts introduced above and discussed in greater detail below may be implemented in any of numerous ways as the described concepts are not limited to any particular manner of implementation. Examples of specific implementations and applications are provided primarily for illustrative purposes.

As described herein, a content experience document can include two types of content—first-party content corresponding to content provided by a content publisher and third-party content corresponding to a third-party content provider. The content experience document can correspond to a particular content experience type.

There is a finite amount of computing resources available for performing various computing tasks. As such, the management of the finite computing resources is an important consideration when designing or implementing new processes and systems. In an effort to conserve the amount of computing resources needed to update the rankings of CETs, the present solution involves identifying particular CETs included in the list of CETs based on their respective rankings and running experiments with available client devices in such a manner that fewer computing resources are utilized to update the rankings of the CETs. In addition to managing computing resources, the present solution also involves generating content experience documents in real-time based on the client device (and corresponding viewer) to which the content experience document is being transmitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Referring now specifically to FIG. 1A, FIG. 1A is a block diagram depicting an implementation of a system 100 for reducing computer resource utilization when generating or updating rankings of different content experience types (CETs). The system 100 may comprise one or more client devices 104 (which may be referred to herein as "the client device 104"), a content experience server 110, and a portal server 160, each of which can communicate with one another via one or more networks, such as the network 106. In some implementations, the network 106 may include a local area network (LAN), wide area network (WAN), a telephone network, such as the Public Switched Telephone Network (PSTN), a wireless link, an intranet, the Internet, or combinations thereof.

Referring to the content experience server 110 in more detail, the content experience server 110 can include one or more data processors 112 configured to execute instructions stored in a memory 114 to perform one or more operations described herein. The memory 114 may be one or more memory devices. In some implementations, the processor 112 and the memory 114 of the content experience server 110 may form a processing module. The processor 112 may include a microprocessor, an application-specific integrated circuit (ASIC), a field-programmable gate array (FPGA), etc., or combinations thereof. The memory 114 may include, but is not limited to, electronic, optical, magnetic, or any other storage or transmission device capable of providing processor with program instructions. The memory 114 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 112 may process instructions and output data to effect presentation of one or more content experience documents to the client device 104. Content experience server 110 may also include a communications interface (not shown) configured to receive data via the network 106 and to provide data from the content experience server 110 to any of the other devices on the network 106.

In some implementations, the content experience server 110 may comprise one or more applications, services, routines, servers, daemons, or other executable logics for generating or updating a ranking of content experience types. These applications, services, routines, servers, daemons, or other executable logics may be integrated such that they may communicate with one another or be enabled to make calls to routines of each other. In some implementations, these applications, services, routines, servers, daemons, or other executable logics may include a content experience type ("CET") selector 116, a feedback request document generator 122, a ranking manager 126, a CET data store 128, a device identifier data store 130, a feedback data store 132, a CET ranking data store 134, and a content experience data store 136.

The CET selector 116 may be executed on the content experience server 110 and may comprise one or more applications, services, routines, servers, daemons, or other executable logics for selecting CETs from a list of CETs to generate a subset of CETs of the list of CETs. The CET selector 116 may select CETs from a list as part of a process of generating a ranking of CETs or as part of a process of updating a ranking of CETs. The CET selector 116 may select the CETs from the list of CETs stored in a CET data store 128, or stored in a datastore accessible to CET selector 116. The CET selector 116 can select the CETs from the list to generate a preliminary subset of CETs that the content experience server 110 is seeking to rank. In some implementations, the CET selector 116 can select CETs randomly to generate a subset of CETs to be ranked. In one implementation, the CET selector 116 can select CETs based on input from an administrator of the content experience server 110. In some implementations, the CET selector 116 can select CETs based on an algorithm stored in the memory of content experience server 110 or accessible by content experience server 110. In some implementations, the CET selector 116 can select CETs based on feedback stored in the memory of content experience server 110 or accessible by content experience server 110. In some implementations, the CET selector 116 can select CETs based on one or more rules of the CETs. For instance, the CET selector 116 can select CETs that each include a rule that any content experience document generated in accordance with the CET includes both first-party content and third-party content The generated subset of CETs may include CETs to be ranked, and the generated subset of CETs may be used to select, request, retrieve or generate content experience documents that will be served to viewers at client devices 104 in an effort to rank the CETs included in the subset relative to one another. The feedback received from the viewers on the content experience documents served to them can be analyzed and used to generate or update the rankings of the CETs relative to one another.

Once the CET selector 116 has generated a subset of CETs to rank and has begun the process of ranking the CETs, the CET selector 116 or the content experience server 110 can generate one or more rankings of the subset of CETs. These rankings may change as more feedback is received and analyzed.

To update the rankings of the CETs previously generated by the CET selector 116 or the content experience server 110, the CET selector 116 can select a plurality of CETs from the generated ranking of CETs to include in an update subset of CETs. The CET selector 116 can strategically select the plurality of CETs from the generated ranking of CETs according to a CET selection policy that is directed towards reducing the number of iterations the content experience server will need to generate an updated ranking of CETs with a predetermined degree of accuracy. Each CET included in the generated ranking of CETs can correspond to a particular rank number.

The CET selection policy can include one or more rules for selecting CETs from the generated ranking of CETs. One rule of the CET selection policy can be to select CETs from the generated ranking of CETs for inclusion the update subset of CETs in such a way that the number of CETs ranked between the highest ranked CET of the plurality of CETs and the lowest ranked CET of the plurality of CETs included in the update subset is less than a predetermined threshold. The predetermined threshold may be a predetermined number, or may be a number based on to the overall number of CETs in the ranking, or may be a percentage of the overall number of CETs in the ranking. In some implementations, a threshold may correspond to 10% of the overall number of CETs in the ranking. As an example, if the generated ranking of CETs includes 100 CETs, the update subset may include 5 CETs and the difference between the highest ranked CET (for instance, rank #45) of the 5 CETs and the lowest ranked CET (for instance, rank #55) of the 5 CETs may be 10% of the overall number (for instance, 100) of CETs in the ranking.

By selecting CETs in this manner, the content experience server 110 can improve the performance of the content experience server 110. In particular, the content experience server 110 can conserve computer resources by reducing the number of iterations required to update a ranking, or to update a ranking to a required degree of certainty that the ranking is correct. The number of required iterations may be reduced by avoiding generating a subset comprising CETs having a large disparity in ranking. For many rankings, including rankings generated in the manner described above, when there is a large disparity in ranking between two CETs, it is more likely that the relative ranking order (which one is higher ranked) of two CETs is correct as compared to the relative ranking order of two CETs that are closely ranked. In other words, there is more uncertainty about the proper ranking order (an order reflective of preferences of a general population) of two CETs that are closely ranked than there is uncertainty about the proper ranking order of two CETs that are ranked far apart.

In some implementations where a ranking that was generated in the manner described above is being updated, it is more certain that a $4^{th}$ ranked CET and a $99^{th}$ ranked CET are in the proper ranking order than a $48^{th}$ ranked CET and a $50^{th}$ ranked CET are in the proper ranking order. By configuring the CET selector 116 to select closely ranked CETs, iterations of receiving update feedback may be focused on updating the rankings of those CETs between which there is most uncertainty. This can reduce the overall number of iterations required to reach an update termination condition, such as when the termination condition is based on uncertainty being below a threshold, or when the termination condition is based on an update not changing a ranking, thereby conserving computer resources.

The feedback request document generator 122 may be executed on the content experience server 110 and may comprise one or more applications, services, routines, servers, daemons, or other executable logics for generating one or more feedback request documents. A feedback request document is an electronic document that can be transmitted to a client device to receive feedback on content experience documents included in the feedback request document. The feedback request document can include a plurality of content experience documents generated by the feedback request document generator 122. The content experience documents can correspond to particular content experience types. In particular, the content experience documents can correspond to content experience types included in the same update subset such that the feedback received in response to the content experience documents included in the feedback request document can be used to update the rankings of the CETs relative to one another based on the feedback of the viewer of the feedback request document and the correlation between the content experience documents and the CETs. Details of a feedback request document are provided with respect to FIG. 1B and FIGS. 8-14.

In some implementations, the feedback request document generator 122 may generate one or more content experience documents corresponding to the CETs included in the update subset. The content experience documents can be generated in accordance to one or more rules of the CETs. In some implementations, the feedback request document generator 122 can create or generate the content experience documents by generating an electronic document that includes a first party content item and a third-party content item. The first party content item can be an article, blogpost, or other content. In some implementations, the first party content item can be a content item that is stored in memory of the content experience server or otherwise accessible by the content experience server 110. In some implementations, the feedback request document generator 122 may select a first party content item to include in the content experience document according to one or more of the rules or parameters of the CET.

Each CET can include one or more rules, parameters or characteristics that define the CET. For instance, a first CET may include a rule that each content experience document corresponding to the first CET must include a first party content item that includes at least two paragraphs and a third party content item is inserted between the first and second paragraph of the first party content item. In one implementation, one rule of the CET can be that a file type of the third-party content item is a video file. In one implementation, one rule of the CET can be that a file size of the third-party content item is less than 25 MB. In one implementation, one rule of the CET can be that a size of the content slot within which the third-party content item is rendered is 320×240. In one implementation, one rule of the CET can be that a location of the third-party content item is between the first and second paragraph of a first party content item. In one implementation, one rule of the CET can be that the third-party content item is selected based on the client device's browsing history. In one implementation, one rule of the CET can be that the third-party content item is selected based on an interest declared by the viewer of the client device to which the feedback request document is being transmitted.

In some implementations, the feedback request document can include one or more containers within which content experience documents can be inserted. In some implementations, the feedback request document can include a script in the containers that, when executed at the client device, cause the client device to generate, assemble or otherwise create a content experience document. For instance, one or more containers can include a script that causes the client device to retrieve a first party content item from a first source (for example, www.examplenews1.com) and a third party content item from a second source (for example, www.exampleshoes2.com). In addition, the script can also include one or more instructions or rules according to which the content items are to be arranged or laid out.

Figure 1B:
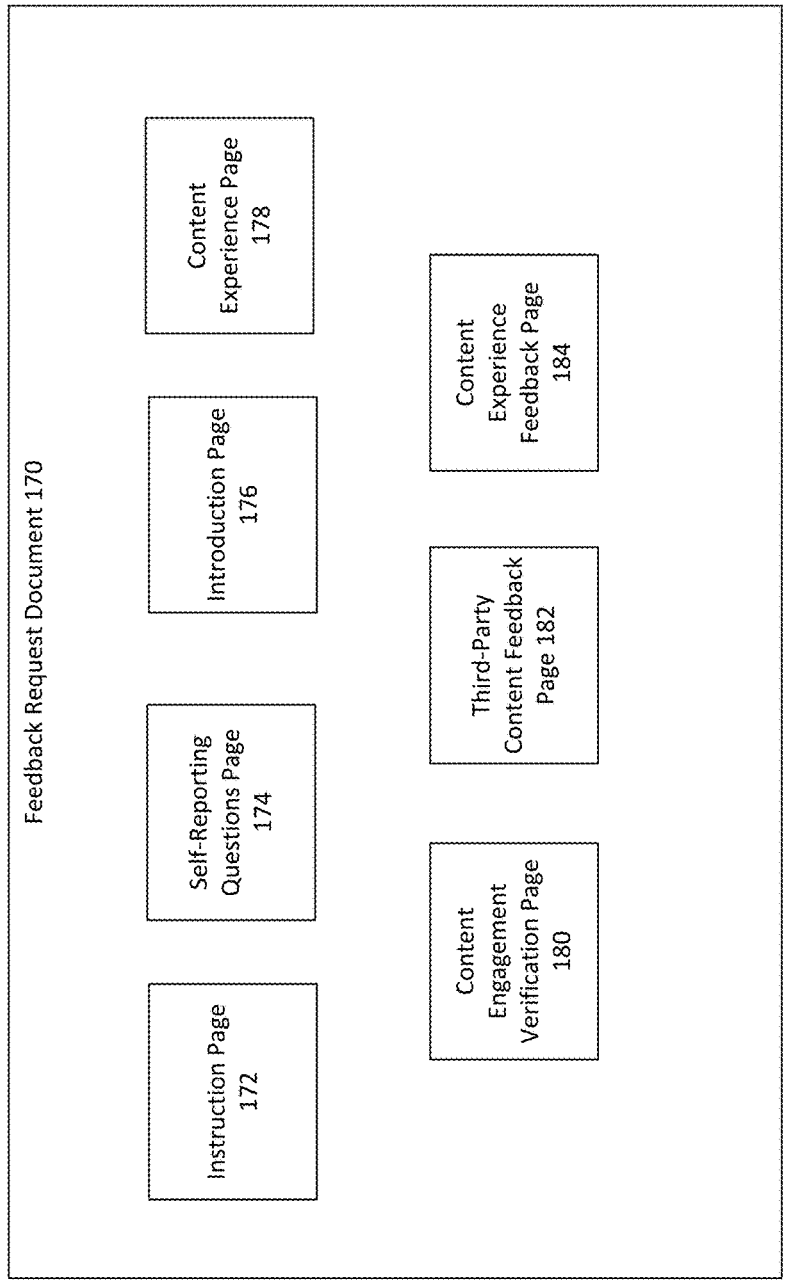
FIG. 1B depicts a block diagram showing various components of a feedback request document.

Referring now to FIG. 1B, FIG. 1B depicts a block diagram showing various components of a feedback request document 170. The feedback request document 170 may include an instruction page 172 that explains how to complete a feedback request document or to submit feedback via a feedback request document. The feedback request document 170 can include a self-reported questions page 174 that offers a viewer a chance to self-report information about themselves. There may also be an option to decline to self-report information. The feedback request document 170 may further include an introduction page 176, informing the viewer of what they will be viewing on other pages of the feedback request document. The feedback request document 170 can yet further include a content experience document page 178, which comprises a content experience document that can include both a first-party content item and a third-party content item. The feedback request document 170 may still further include a content engagement verification page 180 that may comprise questions, the answers to which can be used to verify that the viewer has engaged with some of the content of the feedback request document. The feedback request document 170 may further include a third-party content feedback page 182 that may ask the viewer to submit feedback on a third-party content item of the feedback request document 170. The feedback request document 170 can further comprise a content experience feedback page 184, which may ask the viewer to submit feedback on one or more content experience documents of the feedback request document. The above mentioned pages 172-184 of the feedback request document 170 are described in further detail below in reference to FIGS. 8-14. Although each of the pages 172-184 are referred to herein as pages, each of the pages may be content objects that may be included in a single page, multiple pages or in one or more information resources, among others.

Referring again to FIG. 1A, the feedback request document generator 122 can generate a feedback request document based on an identifier (for instance, a device identifier, among others) corresponding to the recipient of the feedback request document. The feedback request document may comprise content experience documents that include a third-party content item selected based on the identifier corresponding to the recipient of the feedback request document. In some implementations, the feedback request document generator 122 can determine a category or interest to which the identifier corresponding to the recipient may belong. For instance, the category or interest can be politics, sports, music, among others. In some implementations, the category or interest can be a geographical region, among others. Responsive to the feedback request document generator 122 determining that the identifier is related to a particular category or interest, the feedback request document generator 122 can generate content experience documents that correspond to CETs included in the update subset for which the content experience server is updating rankings. In some implementations, the feedback request document generator 122 can generate content experience documents in accordance with one or more policies or rules corresponding to the particular CETs included in the update subset. In some implementations, the feedback request document generator 122 can generate at least one content experience document for each CET included in the update subset.

The feedback request document generator 122 can then insert the generated content experience documents corresponding to the CETs included in the update subset in the feedback request document. In some implementations, the feedback request document generator 122 can generate the feedback request document by inserting the generated content experience documents corresponding to the CETs included in the update subset in an electronic document that includes one or more placeholders.

In some implementations, the feedback request document generator 122 may be configured to identify a recipient of a feedback request document from a list of potential recipients. The list of potential recipients may be or correspond to a list of device identifiers. In some implementations, the list of potential recipients may be stored in memory 114 of content experience server 110 or may be accessible by content experience server 110. The list of potential recipients may include potential recipients (or viewers) who have volunteered or requested to receive feedback request documents, or who have volunteered or requested to participate in a feedback process. The request may have been received directly or indirectly by the content experience server 110. The request can include requesting device information (e.g., a web browser type, an operating system type, one or more previous resource requests from the requesting device, one or more previous content items received by the requesting device, a language setting for the requesting device, a geographical location of the requesting device, or other data pertaining to the requesting device, etc.

In some implementations, a request to receive a feedback request document may comprise self-reported information of interest. In some implementations, a potential recipient may submit a form via a portal to request receiving feedback request documents. In some implementations, the form may include information that the potential recipient is requested to fill. The information can then be used by the content experience server 110 to identify potential recipients for ranking various CETs. In some implementations, the content experience server 110 may use the information from the potential recipient to determine an update subset for which the potential recipient may be a good fit. In some implementations, the feedback request generator 122 can identify a recipient from the list of potential recipients based on the self-reported information of interest. The feedback request generator 122 may identify a prioritized category of recipients corresponding to self-reported information of interest, and may identify a recipient that belongs to that category. The content experience server 110 may identify a prioritized category of recipient based on an algorithm, based on historical data, based on a degree of uncertainty in a ranking related to the category of recipient, based on input from an administrator of the content experience server 110, based on a lack of data or feedback related to the category of recipient, or any combination of these, or in any other appropriate manner. In one implementation, the feedback request generator 122 can identify viewers that have an interest in sports as a category of recipient based on input from an administrator of content experience server 110 instructing the content experience server 110 to supplement stored feedback related to categories for which uncertainty in a ranking related to the category is above a threshold level, and based on a determination by the feedback request generator 122 that uncertainty of a ranking related to that category is above a threshold level. In other implementations, the feedback request generator 122 can identify a recipient at random from the list of potential recipients. The feedback request generator 122 may identify a recipient based on an algorithm. The feedback request generator 122 may identify a recipient as part of an iterative process of receiving preliminary feedback information, and may identify a recipient different from a recipient identified in a previous iteration. The feedback request generator 122 may identify a recipient using any appropriate manner, including any appropriate combination of the above described methods.

The ranking manager 126 may be executed on the content experience server 110 and may comprise one or more applications, services, routines, servers, daemons, or other executable logics for generating or updating the ranking of CETs. The ranking manager 126 may update the rankings of the CETs based on feedback on one or more feedback request documents received by the content experience server 110 from the one or more client devices 104.

The feedback may be across one or more metrics, such as annoyance, satisfaction, uneasiness, interest, or any other appropriate metric corresponding to a viewer's experience when presented with the content experiences. The feedback may concern one or more content experience documents. The feedback may be a ranking of content experience documents of the feedback request document relative to each other.

In some implementations, the ranking manager 126 may assign a feedback score to a content experience document relative to another content experience document The feedback score may be initially set to zero, or to any other appropriate starting feedback score, such as a feedback score based on predetermined information, and points may be subsequently added. Feedback received from one client device 104 may have ranked a first content experience document below a second content experience document. In this case, a point may be subtracted to the feedback score for the first content experience document relative to the second content experience document, and the feedback score may now be −1. A feedback score for the second content experience document relative to the first content experience document may be the negative of the above-mentioned score, +1. Feedback received from two other client devices 104 may have ranked the first content experience document above the second content experience document, and the feedback score for the first content experience document relative to the second content experience document may have two points added to it, making the feedback score +1. Feedback on other content experience documents may also be received. In this implementation, a feedback score for a first content experience document relative to a second content experience document may be +3, a feedback score for a first content experience document relative to a third content experience document may be +1, and a feedback score for a second content experience document relative to a third content experience document may be +1.

The ranking manager 126 may determine an accuracy score for a plurality of potential rankings based on feedback scores, and the potential rankings may comprise every possible different ranking of content experience documents of a feedback request document. In this implementation, the potential rankings may include, in order of highest ranked to lowest ranked, 6 rankings: [1,2,3,], [1,3,2,], [2,1,3,], [2,3,1,], [3,1,2], [3,2,1], each number in the brackets corresponding to a content experience document. An accuracy score for the first of these potential rankings, [1,2,3], may be calculated as follows.

The accuracy score may be initially set to zero, or to any other appropriate starting accuracy score, such as an accuracy score based on predetermined information, and points may be subsequently added. Generally, points may be added to the accuracy score based on the feedback score for the highest ranked content experience document relative to each lower ranked content experience document, and points may be added to the accuracy score based on the feedback score for the second highest ranked content experience document relative to each lower ranked content experience document, and so on until the last points are added based on the feedback score for the second-to-last ranked content experience document relative to the last ranked content experience document. The accuracy score in the present implementation for the potential ranking [1,2,3] may have points added to it equal to the feedback score of the highest ranked content experience document relative to the second highest ranked content experience document, and may further have points added to it equal to the feedback score of the highest ranked content experience document relative to the third ranked content experience document, and may further have points added to it equal to the feedback score of the second highest ranked content experience document relative to the third ranked content experience document.

In this implementation, this may correspond to adding +3, +1, and +1 to the accuracy score for a total accuracy score of +5 for the potential ranking [1,2,3]. For the potential ranking [2,3,1], the accuracy score may be calculated by adding +1,−3, −1 (corresponding to the feedback scores of the second content experience document relative to the third content experience document, the second content experience document relative to the first content experience document, and the third content experience document relative to the first content experience document, respectively) to the accuracy score for a total accuracy score of −4. The ranking manager 126 can be configured to calculate an accuracy score for each potential ranking of content experience documents. Ranking manager 126 may select the potential ranking having the highest accuracy score. In this implementation, the selected ranking would be [1,2,3]. The ranking manager 126 may determine the CETs based on which the content experience documents 1, 2 and 3 were selected, such as the CETs of the update subset of CETs generated by CET selector 116. The ranking manager 126 may generate a ranking of the determined CETs based on the potential ranking of corresponding content experience documents. In some implementations, the ranking manager 126 can be executed on the content experience server 110 and may comprise one or more applications, services, routines, servers, daemons, or other executable logics for updating a ranking of content experience types based on feedback. The ranking manager 126 may implement a ranking update process that involves an accuracy score, as described above in reference to the ranking generation process. An initial accuracy score for a ranking being updated may be set based on an accuracy score previously used to generate the ranking that is being updated, such as in the manner described above, or may be an updated accuracy score generated in a previous iteration of updating a ranking.

In some implementations, other methods may be used for generating a ranking. For example, a Bradley-Terry algorithm for overall score ranking may be used. The Bradley-Terry algorithm models the probability of a content experience document i being ranked over a content experience document j through maximizing the likelihood of observed data. Assume that $\alpha_i$ is a ranking score of a content experience document i (with higher-ranked content experience documents have higher ranking scores), such as a feedback score or a score that is initialized to zero and is incremented once for each instance of the content experience document i being ranked higher than another content experience document in a feedback request document response. The probability of content experience document i being ranked over content experience document j can be expressed as $\alpha_i/(\alpha_i+\alpha_j)$. Thus, the log-likelihood function of parameters $\{\alpha\}$ is $$L(\alpha) = \log\left\{\prod_{1<i,j<n}\left(\frac{\alpha_i}{\alpha_i+\alpha_j}\right)^{w_{ij}}\right\} = \sum_{i=1}^{n}\sum_{j=1}^{n}\{w_{ij}\log\alpha_i = w_{ij}\log(\alpha_i+\alpha_j)\},$$

where $w_{ij}$ denotes how many times content experience document i is ranked over content experience document j, and n is the number of total content experience documents being ranked. The parameters estimates $\{\alpha\}$ can be obtained through an iterative process and the corresponding confidence intervals can be calculated through quasi-variance. An optional step includes rescaling the parameters $\{\alpha\}$ to be in a range, such as a range of [1, 5], by setting α of the least preferred content experience document to be 1 and of the most preferred content experience document to be 5, which can allow for assigning an overall "score" to each content experience document. The ranking manager 126 can generate rankings of content experience documents using Bradley-Terry analysis rankings as described above, and can generate rankings of CETs that correspond to the rankings of content experience documents. The ranking manager 126 can update rankings of CETs by generating a new ranking of CETs using Bradley-Terry analysis that incorporates new ranking data, and setting the newly generated ranking of CETs as an updated ranking. Rankings may be updated by the ranking manager 126 at any appropriate time, such as based on user input, at predetermined intervals, or at a time determined by the ranking manager 126 based on an algorithm.

As mentioned above, the content experience server 110 may comprise data stores, including the CET data store 128, device identifier data store 130, the feedback data store 132, the CET ranking data store 134 and the content experience data store 136. These data stores may include, but are not limited to, electronic, optical, magnetic, or any other storage or transmission device capable of providing processor with program instructions. The data stores may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as, but not limited to, C, C++, C#, Java®, JavaScript®, Perl®, HTML, XML, Python®, and Visual Basic®. In some implementations, one or more of the CET data store 128, device identifier data store 130, the feedback data store 132, the CET ranking data store 134 and the content experience data store 136 may not be included within the content experience server 110 but may be accessible to content experience server 110 over a network, over a LAN connection, or in any other appropriate manner.

The CET data store 128 may be configured to store CETs. As described above, CETs may be defined by one or more characteristics of a first-party content item or of a third-party content item, or a characteristic of a combination of the two, included in a content experience.

In some implementations, device identifier data store 130 may store identifiers identifying recipients of the feedback request documents, such as device identifiers. The identifiers may be device identifiers of the viewers of feedback request documents, and the device identifiers may have been received by content experience server 110 responsive to receiving a request, from the client device, for a feedback request document.

In some implementations, the feedback data store 132 may store feedback received from the one or more client devices 104. As described above, the feedback may include feedback on a feedback request document received by the content experience server 110 from a viewer at a client device 104. The feedback may be across one or more metrics, such as annoyance, satisfaction, uneasiness, interest, or any other appropriate metric corresponding to a viewer's experience when presented with the content experience documents. The feedback may concern one or more content experience documents. The feedback may be a ranking of content experience documents of the feedback request document relative to each other. Feedback may be any other type of appropriate feedback.

In one implementation, the CET ranking data store 134 may store rankings of CETs or of content experience documents. The CETs may have been predetermined, may have been input to CET ranking data store 134 by an administrator of the content experience server 110, or may be generated by an algorithm, such as an algorithm that determines a pattern of feedback for previously defined CETs and generates a new CET defined by characteristics shared by the existent CETs.

In some implementations content experience data store 136 may store content experience documents. As described above, content experience documents may comprise first-party content, third-party content, or any combination of content. Third-party content may comprise simulated third-party content, in that the same party provides first-party content and third-party content, and the third-party content has a look, sound or feel of actual third-party content. A content experience document may comprise articles, videos, ads, audio content, tactile content, or any other content.

Referring now to the client device 104, in some implementations, the client device 104 can include one or more devices such as a computer, laptop, desktop, smart phone, tablet, personal digital assistant, set-top box for a television set, a smart television, or server device configured to communicate with other devices via the network 106. The device 104 may be any form of portable electronic device that includes a data processor 140 and a memory 142. Memory 142 may store machine instructions that, when executed by a processor, cause the processor to perform one or more of the operations described herein. Memory 142 may also store data to effect presentation of one or more resources, content items, etc. on the computing device. Processor 140 may include a microprocessor, an application-specific integrated circuit (ASIC), a field-programmable gate array (FPGA), etc., or combinations thereof. Memory 142 may include, but is not limited to, electronic, optical, magnetic, or any other storage or transmission device capable of providing processor with program instructions. Memory 142 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor 140 can read instructions. The instructions may include code from any suitable computer programming language such as, but not limited to, ActionScript®, C, C++, C#, HTML, Java®, JavaScript®, Perl®, Python®, Visual Basic®, and XML.

Client device 104 can execute a software feedback request document application 146 (e.g., a web browser or other application) to retrieve content from other computing devices over the network 106. The feedback request document application 146 may be configured to retrieve web page data from the content experience server 110, or from the portal server 160, or from any other source accessible over a network. In some implementations, the feedback request document application 146 can be a web browser, and the client device 104 may execute the web browser application to provide a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 104 executing the instructions from the web browser application may request data from another device connected to the network 106 referred to by the URL address. The other device may then provide web page data and/or other data to the client device 104, which causes visual indicia to be displayed by a display 144 of the client device 104. Accordingly, the browser window displays the retrieved content, such as web pages from various websites.

Referring to the portal server 160 in more detail, the portal server 160 can include one or more data processors 162 configured to execute instructions stored in a memory 164 to perform one or more operations described herein, and can further include a feedback request document interface application 164 that, when executed, can establish a communication session with the client device 104 to transmit the feedback request document as well as receive feedback data related to the feedback request document from the client device 104. The memory 164 may be one or more memory devices. In other words, the processor 162 and the memory 164 of the portal server 160 may form a processing module. The processor 162 may include a microprocessor, an application-specific integrated circuit (ASIC), a field-programmable gate array (FPGA), etc., or combinations thereof. The memory 164 may include, but is not limited to, electronic, optical, magnetic, or any other storage or transmission device capable of providing processor with program instructions. The memory 164 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 162 may process instructions and output data to establish a communication session with the client device 104 to transmit the feedback request document as well as receive feedback data related to the feedback request document from the client device 104. The portal server 160 may also include a communications interface (not shown) configured to receive data via the network 106 and to provide data from the portal server 160 to any of the other devices on the network 106.

In some implementations, the portal server 160 can include a computing device, such as a server, configured to host a resource, such as a web page or other resource (e.g., articles, comment threads, music, video, graphics, search results, information feeds, etc.). In some implementations, the content experience server 110 may comprise the portal server 160, or may perform the functions of the portal server 160. In other implementations, the portal server 160 may be accessible to the content experience server 110 via network 106. The portal server 160 may be a computer server (e.g., a file transfer protocol (FTP) server, file sharing server, web server, etc.) or a combination of servers (e.g., a data center, a cloud computing platform, etc.). The portal server 160 can provide resource data, a feedback request document, or other content (e.g., text documents, PDF files, and other forms of electronic documents) to the client device 104. In one implementation, the client device 104 can access the portal server 160 via the network 106 to request data to effect presentation of a resource of the portal server 160.

In some implementations, the portal server 160 may include a feedback request document interface application 164 that, when executed by the portal server 160, can establish a communication session with the client device 104 to transmit the feedback request document as well as receive feedback data related to the feedback request document from the client device 104. can establish a communication session with the client device 104 to transmit the feedback request document as well as receive feedback data related to the feedback request document from the client device 104. In other implementations, the feedback request document interface application may, when executed, perform any of the functions discussed above in reference to the portal server 160.

In some implementations, the portal server 160 may host a content experience feedback webpage that may serve as a portal for connecting a client device 104 to the content experience server 110. The content experience feedback webpage may comprise a feedback request document. In some implementations, the client device 104 may be caused to access a content experience feedback webpage, and the content experience feedback webpage may provide resources to the client device 104 that allow the client device 104 to request content experience documents, or allow a client device 104 to request a feedback request document that comprises at least one content experience document. In some implementations, a content experience feedback webpage may be an online marketplace that may connect candidate survey takers with survey providers.

While the foregoing has provided an overview of an implementation of a system 100 for updating a ranking of content experience types and an overview of an implementation of a feedback request document 170, examples of methods and systems for updating a ranking of content experience types will now be described in reference to FIGS. 2-15.

Referring to FIGS. 2A through 2C in general, FIGS. 2A-2C depict an implementation of feedback being received and a ranking being generated and updated. More specifically, FIG. 2A depicts an implementation of a ranking being generated by the ranking manager 126 based on feedback received from the client device 104, FIG. 2B depicts a ranking being updated by the ranking manager 126 via a first ranking update process based on feedback received from the client device 104, and FIG. 2C depicts a ranking being updated by the ranking manager 126 via a second ranking update process, in accordance with implementations of methods and systems described in this specification, based on feedback received from client device 104.

FIG. 2A depicts an implementation of a ranking 220 being generated by the ranking manager 126 based on feedback received from client devices 104. This generation of a ranking may be performed in any appropriate manner, such as a manner described above in reference to FIG. 1A. In one implementation, three items of feedback may be received by content experience server 110 from three different client devices: feedback 210A, feedback 210B, and feedback 210C. Each item of feedback can correspond to a relative preference ranking of three content experience documents of a feedback request document. In this depiction, feedback 210A comprises a relative ranking of the three content experience documents, with content experience document A being ranked first, content experience document B being ranked second, and content experience document C being ranked third. In other implementations, any other number of items of feedback may be received. The feedback can be stored in feedback data store 132. Each item of feedback may correspond to feedback related to a single feedback request document or to multiple feedback request documents.

In some implementations, based on the received feedback, and in some implementations on additional feedback that is not depicted, the ranking manager 126 may generate CET ranking 220. The CET ranking 220 can be a ranking of content experience types CET-A through CET-I. The ranking manager 126 may relate the received feedback 210A-210C to CETs in the manner described above in reference to FIG. 1A as part of the process of generating ranking 220. In this way, content experience document A may be related to CET-A, content experience document B may be related to CET-B, and so on.

FIG. 2B depicts an implementation of a ranking being updated by the ranking manager 126 via a first ranking process based on feedback received from client devices 104. The CET ranking 220 may be updated based on items of feedback 212A, 212B, and 212C. Items of feedback 212A-

212C may be items of feedback similar to items of feedback 210A-210C, described above. In this implementation, the first ranking update process is inefficient because the content experience documents ranked in each item of feedback 212 are already ranked far apart in the initial ranking 220 (depicted in FIG. 2A). That is to say, item of feedback 212A may be received from a client device that has completed a feedback request document that requests feedback for content experience documents A, I and C that are related to CET-A, CET-I, and CET-C, respectively. CET-A, CET-I and CET-C are ranked far apart in the initial ranking being updated: they are ranked #1, #5, and #9, respectively. Thus, for reasons discussed above, it is less likely that the received feedback will result in a change in ranking for those CETs, as compared to a scenario in which CETs that were closely ranked in an initial ranking were included in a feedback request document through corresponding content experience documents. This may be because the large discrepancy in ranking between CET-A, CET-I, and CET-C in the initial ranking may reflect a larger degree of certainty in the correct relative ordering of those CETs relative to a degree of certainty in the correct relative ordering of closely ranked CETs. Similarly, items of feedback 212B and 212C include feedback related to CETs that are ranked far apart in the initial ranking, and for similar reasons are less likely to provide valuable information for updating the initial ranking.

FIG. 2C depicts an implementation of a ranking being updated by the ranking manager 126 via a second ranking process based on feedback received from client devices 104. The CET ranking 220 may be updated based on items of feedback 214A, 214B, and 214C. Items of feedback 212A-212C may be items of feedback similar to items of feedback 210A-210C, described above. In this implementation, the second ranking update process is efficient because each item of feedback includes feedback on content experience document that are related to CETs that are closely ranked in CET ranking 220. This can be accomplished by CET selector 116 selecting CETs that are closely ranked, the feedback request document generator 122 generating feedback request documents that include content experience documents related to those closely-ranked CETs, and providing those feedback request documents to client devices 104. When the content experience server 110 receives feedback 214A, 214B, and 214C concerning those feedback request documents from client devices 104, for reasons discussed above, there may be a greater likelihood that item of feedback 214A provides valuable information for updating the initial ranking than item of feedback 212A than if the first ranking update process were used. FIG. 2C depicts ranking manager 126 updating ranking 220 based on the received feedback.

Referring to FIG. 3, FIG. 3 depicts an implementation of parametrized CETs. In some implementations, data structure 310 can be stored in CET data store 128. Each CET represented in data structure 310 may have parameters associated with it. A CET may be defined by the parameters associated with it. In some implementations, the parameters may generally refer to third-party content of a content experience document unless otherwise defined. In some implementations, CET 1 has a parameter value "4" for a first-party content media type parameter, a parameter value "2" for a media type parameter, a parameter value "3" for a size parameter, a parameter value "0" for an autoplay parameter, and a parameter value "1" for a hyperlink parameter. Referring to the legend depicted in FIG. 3, this can correspond to a CET comprising textual first-party content, such as an article, and further comprising video third-party content. The third party content can be between 1001 and 3000 total pixels in size, may be played responsive to a request to play rather than autoplay, and may include a hyperlink to other content, such as a hyperlink superimposed over a video that links to a third-party web site. CET 2 and CET 3 may be similarly parametrized.

Figure 4:
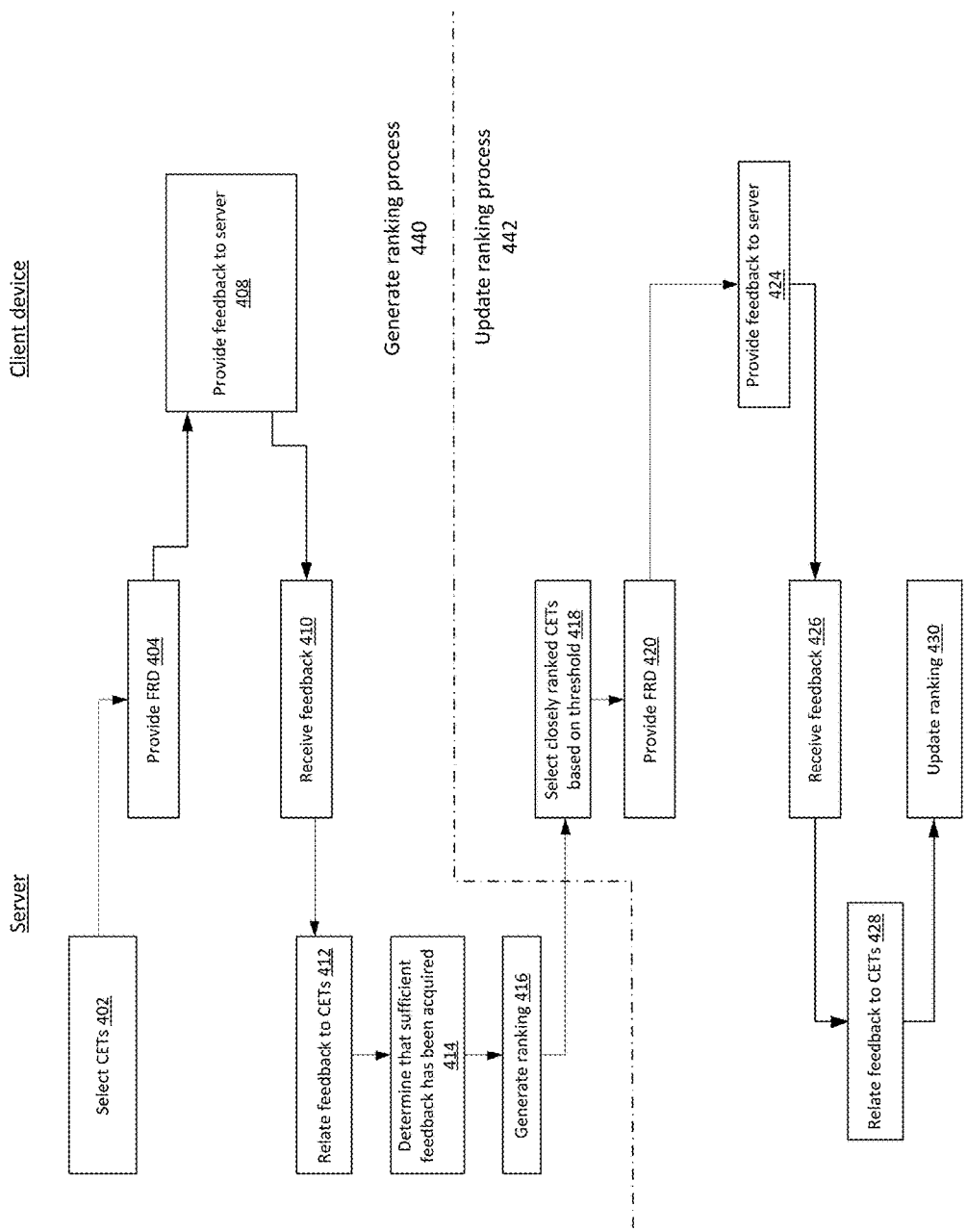
FIG. 4 is a flow chart of an implementation of a method of generating and updating a ranking of content experience types.

Referring to FIG. 4 generally, FIG. 4 depicts an implementation of generating a ranking and updating a ranking. The method of updating a ranking may include a generating a ranking process 440 that includes steps 402-416, and a generating an updating a ranking process 442 that includes steps 418-430. At step 402, the CET selector 416 may select CETs to generate a preliminary subset of CETs. At step 404, the feedback request generator 122 may provide a feedback request document to the client device 104. At step 408, the client device 104 may provide feedback to the content experience server 110. At step 410, the content experience server 110 may receive the feedback. At step 412, the ranking manager 126 may relate the feedback to corresponding CETs. At step 414, the ranking manager 126 may determine that sufficient feedback has been acquired. At step 416, the ranking manager 126 may generate a ranking of CETs based on the feedback. At step 418, the CET selector 116 may select closely ranked CETs from a ranking to be updated based on a threshold. At step 420, the feedback request generator 122 may provide a feedback request document to the client device 104. At step 424, the client device 104 may provide feedback to the content experience server 110. At step 426, the content experience server 110 may receive the feedback. At step 428, the ranking manager 126 may relate the feedback to corresponding CETs. At step 430, the ranking manager 126 may update the ranking of CETs.

Describing the ranking generating process 440 comprising steps 402-416 in more detail, in one implementation, at step 402 the CET selector 416 may select or identify CETs to generate a preliminary subset of CETs from a list of CETs, such as a list of CETs stored in CET data store 128. CET selector 116 may select the CETs randomly. In another implementation, CET selector 116 can select CETs based on input from a manager of content experience server 110, can select CETs based on feedback stored in the memory of content experience server 110 or accessible by content experience server 110. CETs may be selected in any appropriate manner, including in any manner described above in reference to FIG. 1A.

In some implementations, at step 404, the feedback request generator 122 may provide a feedback request document to the client device 104. The feedback request document may include content experience documents corresponding to CETs selected in step 402. The feedback request generator 122 may provide a feedback request document in any appropriate manner, including in any manner described above in reference to FIG. 1A. In some implementations, at step 408, the client device 104 may provide feedback to the content experience server 110 concerning the feedback request document. The feedback may be provided over the network 106. Feedback may be provided to content server 110 in any appropriate manner, including in any manner described above in reference to FIG. 1A. The feedback may be a ranking of the ranking content experience documents, such as a ranking of content experience documents described in detail below in reference to FIGS. 8-14.

In some implementations, at step 410, the content experience server 110 may receive the feedback concerning the feedback request document. Feedback may be received in any appropriate manner, including in any manner described above in reference to FIG. 1A.

In one implementation, at step 412, the ranking manager 126 may relate the feedback concerning the feedback request document to corresponding CETs. Feedback may be related to CETs in any appropriate manner, including in any manner described above in reference to FIG. 1A. The ranking manager 126 can relate the received feedback to CETs by relating content experience documents to corresponding CETs, such as CETs stored in CET data store 128. Content experience server may relate the received feedback to CETs based on stored data related to associations between content experience documents of the feedback request document for which feedback was provided and CETs. Such data may have been stored by content experience server 110 when the feedback request generator 122 provided a feedback request document to client device 104 at step 404.

At step 414, the ranking manager 126 may determine that sufficient feedback has been acquired to generate a ranking. If insufficient feedback has been acquired to generate a ranking, steps 402-412 may be iterated. Such iteration may help in acquiring more feedback upon which to base generation of a ranking. The iterative process may continue until a preliminary termination condition is satisfied. A preliminary termination condition can be any appropriate termination condition. In some implementations, a preliminary termination condition can be a predetermined number of iterations, or can be a user-input number of iterations. In one implementation, a termination condition can be satisfied when all CETs of a list of CETs have been accounted for in that a feedback request document has been provided to a client device, and feedback received from the client device, the feedback request document comprising a content experience document correlated to the CET, for all CETs of the list of CETs. In another implementation, a preliminary termination condition may be input by a manager or content experience server 100, or may be based upon an algorithm, or may be based upon a predetermined number of iterations. A preliminary termination condition may be any other appropriate termination condition for generating a ranking. The ranking manager 126 to determine that sufficient feedback has been acquired based on satisfaction of the preliminary termination condition.

In one implementation, at step 416, the ranking manager 126 may generate a ranking of CETs based on the feedback. The ranking may be generated based on the feedback received from any iterations of steps 402-416. A ranking may be generated in any appropriate manner, including in any manner described above in reference to FIG. 1A.

Next, the ranking update process 442 that includes steps 418-430 will be described. A ranking need not be completely generated before updating can begin. In some implementations, an updating process may begin before completion of generation of a ranking.

In one implementation, at step 418, the CET selector 116 may select closely ranked CETs from a ranking to be updated based on a threshold. Closely ranked CETs can be selected based on a threshold by CET selector 116 in any appropriate manner, including in any manner described above in reference to FIG. 1A.

In another implementation, at step 420, feedback request generator 122 may provide a feedback request document to the client device 104. feedback request generator 122 may provide a feedback request document to client device 104 in any appropriate manner, such as the manner described above in reference to step 404.

In some implementations, at step 424 the client device 104 may provide feedback to the content experience server 110 concerning the feedback request document. Step 424 may be performed in any appropriate manner, including in the manner discussed above in reference to step 408. In one implementation, at step 426, the content experience server 110 may receive the feedback from the client device 104. Step 424 may be performed in any appropriate manner, including the manner described above in reference to FIG. 1A.

In some implementations, at step 428 the ranking manager 126 can relate the received feedback to CETs. This step may be performed in any appropriate manner, such as the manner described above in reference to the ranking manager 126 relating feedback to CETs at step 412. In one implementation, at step 430 the ranking manager 126 can update the ranking of CETs. The ranking may be updated in any appropriate manner, including in any manner described above in reference to FIG. 1A. The ranking may be updated upon completion of step 428, or may be updated after a number of iterations of steps 420-428. Such iteration may help in acquiring more feedback upon which to base generation of a ranking. The iterative process may continue until a termination condition is satisfied. In some implementations, a termination condition may be determined by an administrator or content experience server 100, or may be based upon an algorithm, or may be based upon a predetermined number of iterations. A termination condition may be any other appropriate termination condition for updating a ranking.

In some implementations, a ranking may be updated iteratively, such as by repeating steps 418 through 430 iteratively. The iterative process may continue until an update termination condition is satisfied. An update termination condition can be any appropriate termination condition. In one implementation, a termination condition may be input by a manager or content experience server 100, or may be based upon an algorithm, or may be based upon a predetermined number of iterations. In some implementations, an update termination condition can be based on a predetermined number of iterations. In some implementations, an update termination condition can be based on a number of CETs whose rank changes when a ranking is updated relative to a rank-change threshold. A predetermined rank-change threshold may be 0, 1, 2, 3, 100, or any appropriate number, and if a rank of a CET changes via an update by a number of ranks greater than the rank-change threshold, another iteration of updating may be performed. A termination condition may be any other appropriate termination condition for generating a ranking. An implementation of iterative updating of a ranking of CETs is described below in reference to FIG. 6.

Figure 5:
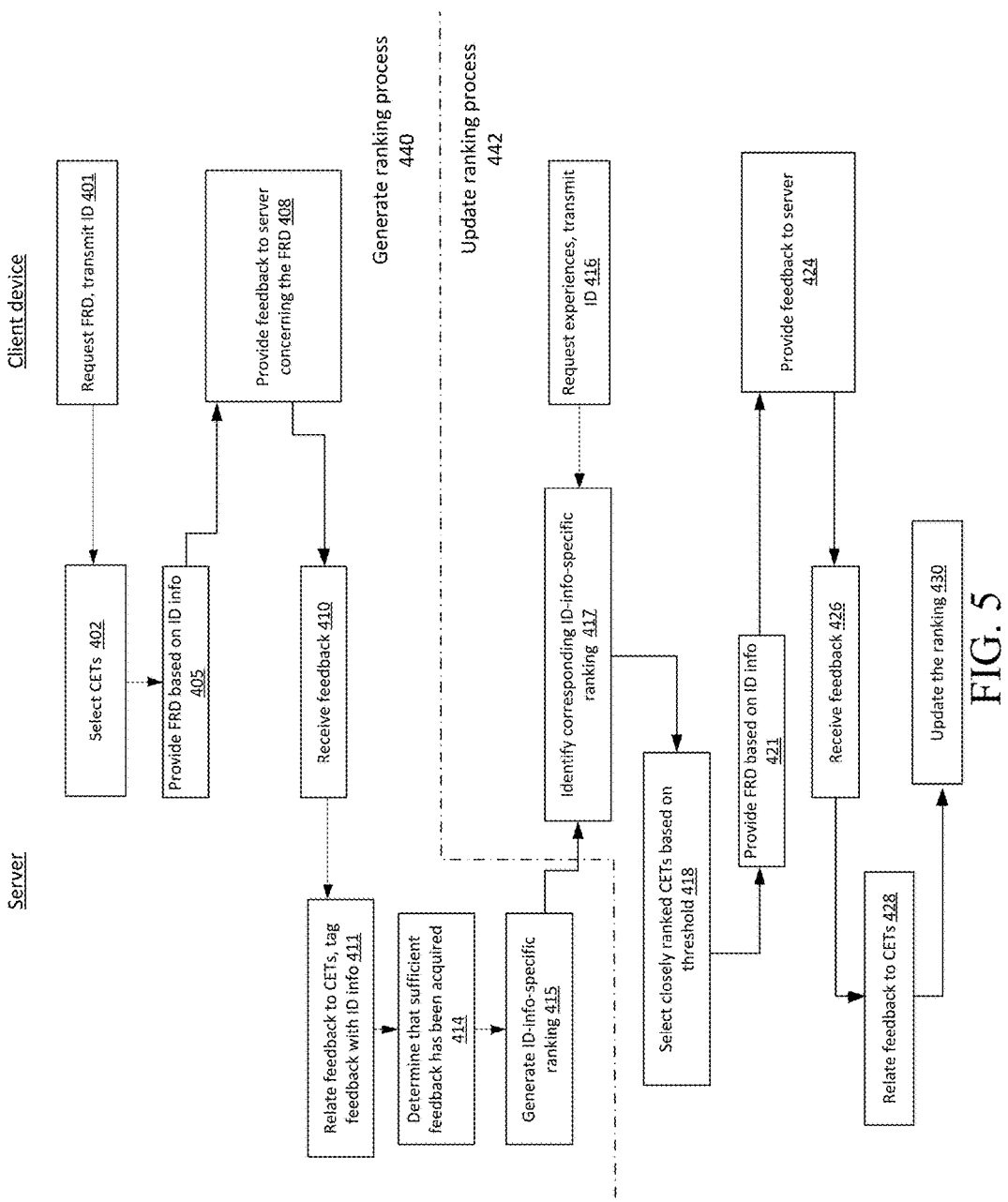
FIG. 5 is a flow chart of an implementation of a method of generating and updating a ranking of content experience types related to specific device identifier information.

Referring to FIG. 5 in general, FIG. 5 depicts an implementation of generating a ranking of CETs related to information of a particular identifier ("identifier-based ranking") or updating such a ranking. An identifier-based ranking may be a ranking that is generated, updated, or both, based on feedback that is received from a client device associated with a particular identifier. The identifier may be associated with specific information, such as a category of interest. Any ranking generated based on such a process can be an identifier-based ranking. In implementations, an identifier-based ranking is generated based only on such identifier-based processes. In other implementations, an identifier-based ranking is generated based on other processes as well. An identifier-based ranking is described in more detail below. FIG. 5 depicts a number of steps that are similar to the steps described above in reference to FIG. 4, including steps 402, 408, 410, 414, 418, and 424-430. Detailed description of such steps will be omitted below, but it should be understood that any of these steps depicted in FIG. 5 can be performed in any manner described above in reference to FIG. 4, as appropriate. FIG. 5 further includes steps 401, 405, 411, 415, 416, 417, and 421, which are described in more detail below.

The process 440 depicted in FIG. 5 can include steps 401, 405, 411, 415, 416, 417, and 421. At step 401, the client device 104 may request a feedback request document, the request comprising an identifier. At step 405, the feedback request generator 122 may provide a feedback request document based on the device identifier. At step 411, the ranking manager 126 may relate the received feedback concerning the feedback request document to corresponding CETs, and may tag the feedback with identifier information related to the device identifier. At step 415, the ranking manager 126 may generate an identifier-based ranking. At step 416, the client device 104 may request a feedback request document, the request comprising a device identifier. At step 417, the ranking manager 126 may identify a ranking of CETs that corresponds to information related to the identifier. At step 421, the feedback request generator 122 may provide a feedback request document to the client device 104 based on the identity information.

Discussing steps 401, 405, 411, 415, 416, 417, and 421 in more detail, in some implementations, at step 401, the client device 104 may request a feedback request document. The request may include or be transmitted with an identifier, as described above in reference to FIG. 1A, or in any other appropriate manner.

In some implementations, at step 405, the feedback request generator 122 may provide a feedback request document based on the device identifier. In one implementation, a device identifier corresponding to a device may be associated with a category of interest, such as sports. The feedback request generator 122 can generate a feedback request document comprising a first content experience, a second content experience, and a third content experience. Each content experience document can include a first-party content item and a third-party content item. The third-party content item for the first content experience document may be selected based on the category of interest, and may be a sports-related third-party content item. The third-party content item for the first content experience document may also correspond to a CET of a subset of CETs selected by the CET selector 116. The generated feedback request document may be provided to the client device 104.

In some implementations, at step 411, the ranking manager 126 may relate the received feedback concerning the feedback request document to corresponding CETs, and may tag the feedback with identifier information related to the device identifier. Tagging the feedback with identifier information may involve associated the feedback with identity information in a data store. Relating feedback on the feedback request document to CETs may be performed in any appropriate manner, such as the manner described in reference to step 428 of FIG. 4 above.

In one implementation, at step 415, the ranking manager 126 may generate an identifier-based ranking. The ranking manager 126 may generate an identifier-based ranking in appropriate manner of generating a ranking, such as that described above in reference to FIG. 1A. Generating an identifier-based ranking can include at least one iteration of steps 401-414 that includes an ID-info specific process comprising all the steps 401-411 depicted in FIG. 5. In some implementations, an identifier-based ranking is generated based only on such identifier-based processes. In other implementations, an identifier-based ranking is generated based on other processes as well, such as the process depicted in FIG. 4

In some implementations, at step 416, the client device 104 may request a feedback request document, the request comprising a device identifier. Such a request may include a device identifier, as described above in reference to FIG. 1A, or in any other appropriate manner.

In some implementations, at step 417, the ranking manager 126 may identify a ranking of CETs that corresponds to identity information related to the device identifier. The ranking manager 126 may identify a ranking to update, the ranking corresponding to information related to a device identifier transmitted to content experience server 110 at step 416. In some implementations, the information related to the device identifier can be a category of interest, and content experience server 110 may identify a ranking corresponding to the category of interest, such as an identifier-based ranking, to update.

In some implementations, at step 421, the feedback request generator 122 may provide a feedback request document to the client device 104 based on the identity information. This may be performed in any appropriate manner, including in the manner described above with respect to step 405 of FIG. 5.

Figure 6:
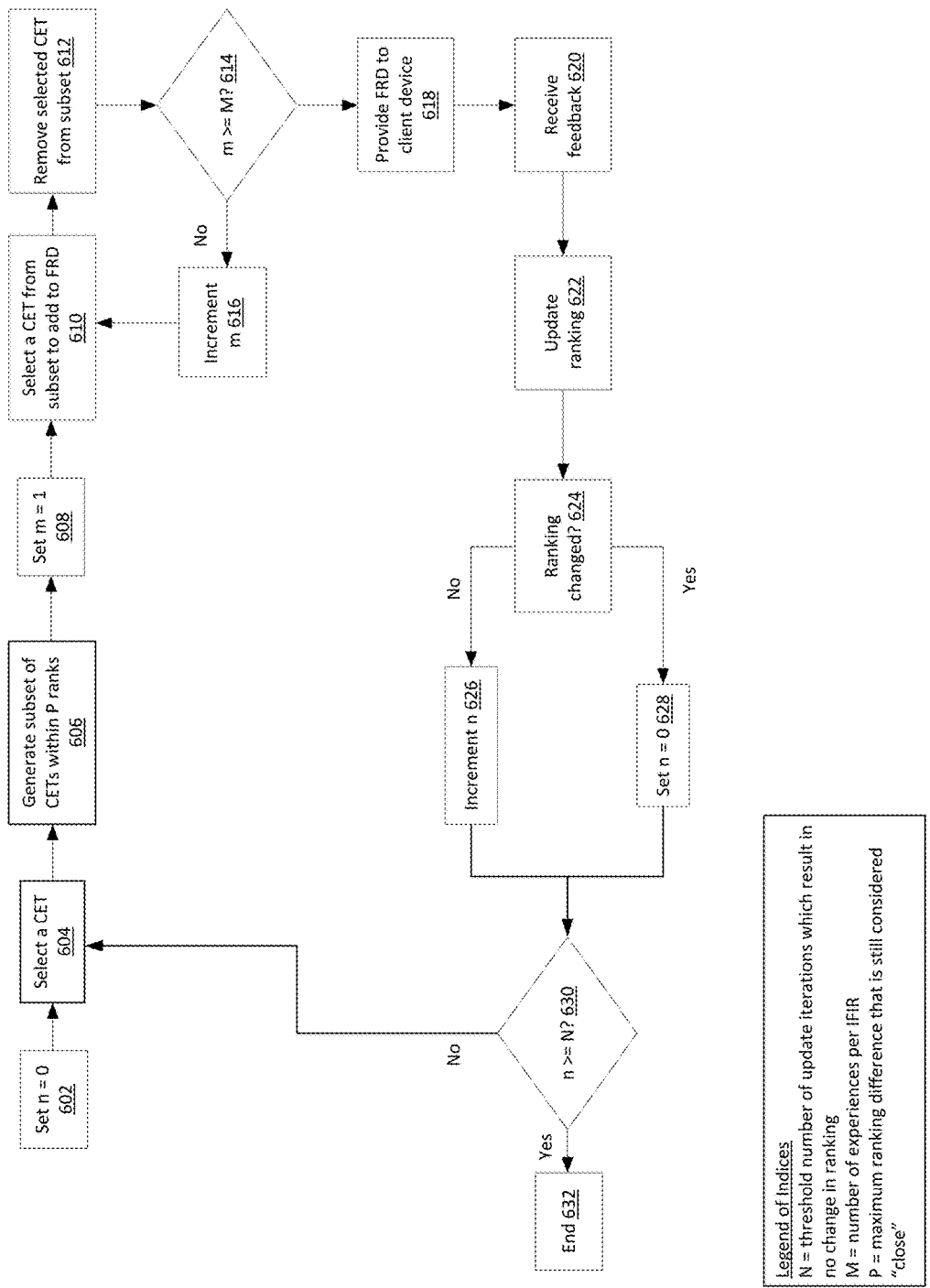
FIG. 6 is a flow chart of an implementation of an iterative process of updating a ranking of content experience types until a termination condition is satisfied.

Referring to FIG. 6 in general, FIG. 6 is a flowchart depicting an implementation of an iterative process of updating a ranking until a termination condition is satisfied. In the depicted implementation, the iterative process may be terminated when a predetermined threshold number N of iterations of updating have occurred with no change in a ranking being updated. As depicted in FIG. 6, in some implementations, at step 602, the content experience server 110 may set index n to 0. At step at step 604, the CET selector 116 can select a CET from a list of CETs for inclusion in an update process. At step 608, content experience server 110 may set index m to 1. At step 610, the CET selector 116 may select a CET from a subset of closely ranked CETs generated in step 606 for indirect inclusion in a feedback request document via inclusion of a content experience document that corresponds to the CET. At step 614, content experience server 110 may compare the index value m to the total number of content experience documents per feedback request document "M." At step 612, CET selector 116 may remove the CET selected for inclusion in step 610 from the subgroup of closely ranked CETs. At step 616, the content experience server 110 may increment index m. At step 618, the content experience server 110 may provide a feedback request document based on the CETs selected in the previous steps depicted in FIG. 6 to a client device 104. At step 620, the content experience server 110 may receive feedback from client device 104. At step 622, the ranking manager 126 may update a ranking. At step 624, ranking manager 126 may determine whether a ranking has changed. If ranking manager 126 determines that the ranking has not changed, content experience server 110 may proceed to step 626 and increment index n, indicated that an update process has occurred and no change in ranking resulted. If ranking manager 126 determines that the ranking has changed, content experience server 110 may proceed to step 628 and set index n to 0. At step 630, content experience server 110 may compare the index value n to the update threshold number N.

In one implementation, at step 602, content experience server 110 may set index n to 0. The index n may index a number of consecutive update iterations that result in no change in ranking. The index n can count at least up to a number N, which can correspond to a predetermined threshold number of update iterations that result in no change in a ranking being updated.

In some implementations, at step 604, CET selector 116 can select a CET from a list of CETs for inclusion in an update process. The CET may be selected in any appropriate manner, such as any manner described above in reference to FIG. 1A. In some implementations, at step 606, CET selector 116 can additionally select all CETs from the list of CETs ranked within P ranks of a CET selected at step 602 to generate a subset of CETs. In this manner, a subset of closely ranked CETs may be generated.

In some implementations, at step 608, content experience server 110 may set index m to 1. The index m may index a number of experiences selected for inclusion in a feedback request document to be generated. The index m can count at least up to a number M, which can correspond to a predetermined number of content experience documents to be included in each feedback request document generated in an update process.

In some implementations, at step 610, CET selector 116 may select a CET from a subset of closely ranked CETs generated in step 606 for indirect inclusion in a feedback request document via inclusion of a content experience document that corresponds to the CET. CET selector 116 may select a CET randomly from the subset of closely ranked CETs, or may select a CET in any other appropriate manner, such as any manner described above in reference to FIG. 1A. In one implementation, at step 612, CET selector 116 may remove the CET selected for inclusion in step 610 from the subgroup of closely ranked CETs. In this manner, a single CET will not be included twice in any feedback request document. In other implementations, this step may be skipped, making it possible to include a CET multiple times in a single feedback request document or include a CET in multiple feedback request documents of a single update process.

In some implementations, at step 614, content experience server 110 may compare the index value m to the total number of content experience documents M per feedback request document. Comparing the index value to the total number of content experience documents M per feedback request document may comprise a bitwise comparison of data strings (e.g. an XOR with a result of 0 indicating the index is equal to the threshold); calculating a difference between the total number of available jobs being analyzed and the index and determining if the result is negative, positive, or zero; or any other such method. This may help determine whether all M of the content experience documents for a feedback request document have been selected. If the index value m is greater than or equal to M, content experience server 110 may proceed to step 618 to provide a feedback request document to a client device. Otherwise, content experience server 110 may proceed to step 616.

In some implementations, at step 616, content experience server 110 may increment index m. This may help to count how many CETs have been selected for inclusion in a feedback request document.

In some implementations, at step 618, content experience server 110 may provide a feedback request document based on the CETs selected in the previous steps depicted in FIG. 6 to a client device 104. The content experience server may provide the feedback request document in any appropriate manner, including in any manner described above in reference to step 420 of FIG. 4, or step 421 of FIG. 5. In some implementations, at step 620, content experience server 110 may receive feedback form client device 104. Content experience server 110 may receive feedback from client device 104 in any appropriate manner, including in any manner described above in reference to step 428 of FIG. 4. In some implementations, at step 622, the ranking manager 126 may update a ranking. The ranking manager 126 may update a ranking in any appropriate manner, including in any manner described above in reference to step 430 of FIG. 4.

In one implementation, at step 624, ranking manager 126 may determine whether a ranking has changed. A ranking may be determined to have changed if any CET in a ranking of CETs changes during an updating process, such as the process of step 622. If ranking manager 126 determines that the ranking has not changed, content experience server 110 may proceed to step 626 and increment index n, indicated that an update process has occurred and no change in ranking resulted. If ranking manager 126 determines that the ranking has changed, content experience server 110 may proceed to step 628 and set index n to 0.

In some implementations, at step 630, content experience server 110 may compare the index value n to the update threshold number N. Comparing the index value to the update threshold number N may comprise a bitwise comparison of data strings (e.g. an XOR with a result of 0 indicating the index is equal to the threshold); calculating a difference between the update threshold number N and the index and determining if the result is negative, positive, or zero; or any other such method. This may help determine whether N consecutive update processes have been completed with no change in ranking. If the index value n is greater than or equal to N, content experience server 110 may proceed to step 432 and terminate the process, the termination condition having been satisfied. Otherwise, content experience server 110 may proceed to step 604.

Figure 7:
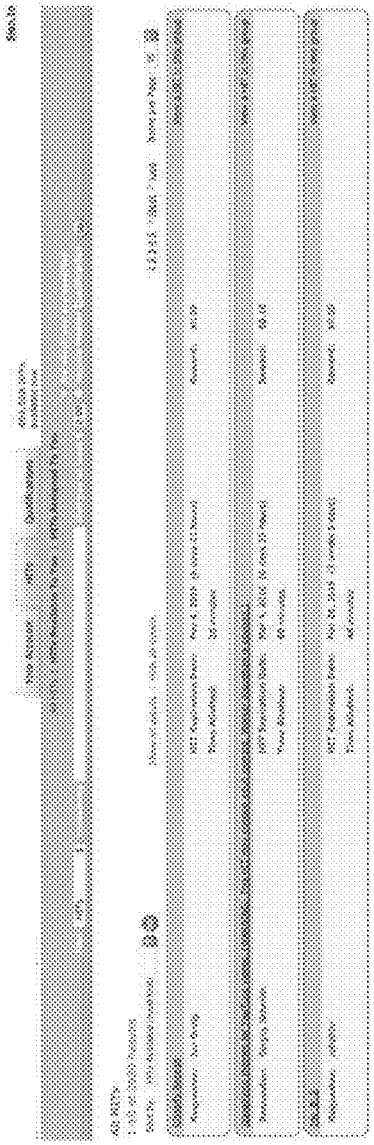
FIG. 7 is a screenshot of a webpage for allowing a feedback request document participant to access or request a feedback request document.

Referring now to FIG. 7, FIG. 7 depicts one implementation of a marketplace webpage 700 listing available jobs, and shows listing information related to a feedback request document. In this implementation, the listing information includes a title for the listing: "You need an Android phone or iPhone. ~20 min study about your experience on mobile webpages." The listing information also includes an estimated time allotment for completing the feedback request document, and a proffered monetary reward.

Referring to FIGS. 8-14 in general, FIGS. 8-14 depict implementations of pages of the feedback request document 170 (depicted as a block diagram in FIG. 1B). In some implementations, feedback request document 170 is a webpage based feedback request document, and a feedback request document participant may be able to access each page of the feedback request document as a separate webpage, or as a separate tab on an information resource displayed on a webpage, or in any other appropriate manner. In some implementations, each page of the feedback request document may have a link to one or more of the other pages of the feedback request document.

Generally speaking, an implementation of a webpage for allowing a candidate feedback request document participant to access or request a feedback request document may be an online jobs or gig marketplace webpage that may connect candidate workers with feedback request document providers. In some implementations, the website may be an online marketplace that may connect potential or candidate survey takers with survey providers. In marketplace implementations, feedback request document participants may be provided with rewards for completing a feedback request document. Rewards can be money, coupons, access to content, or any other suitable reward. Rewards can be provided based on how much of a feedback request document has been completed. In yet other implementations, the website may not be a marketplace at all, and may simply be one means of allowing a candidate feedback request document participant to access or request a feedback request document. Rewards may not be offered for completing a feedback request document.

Figure 8:
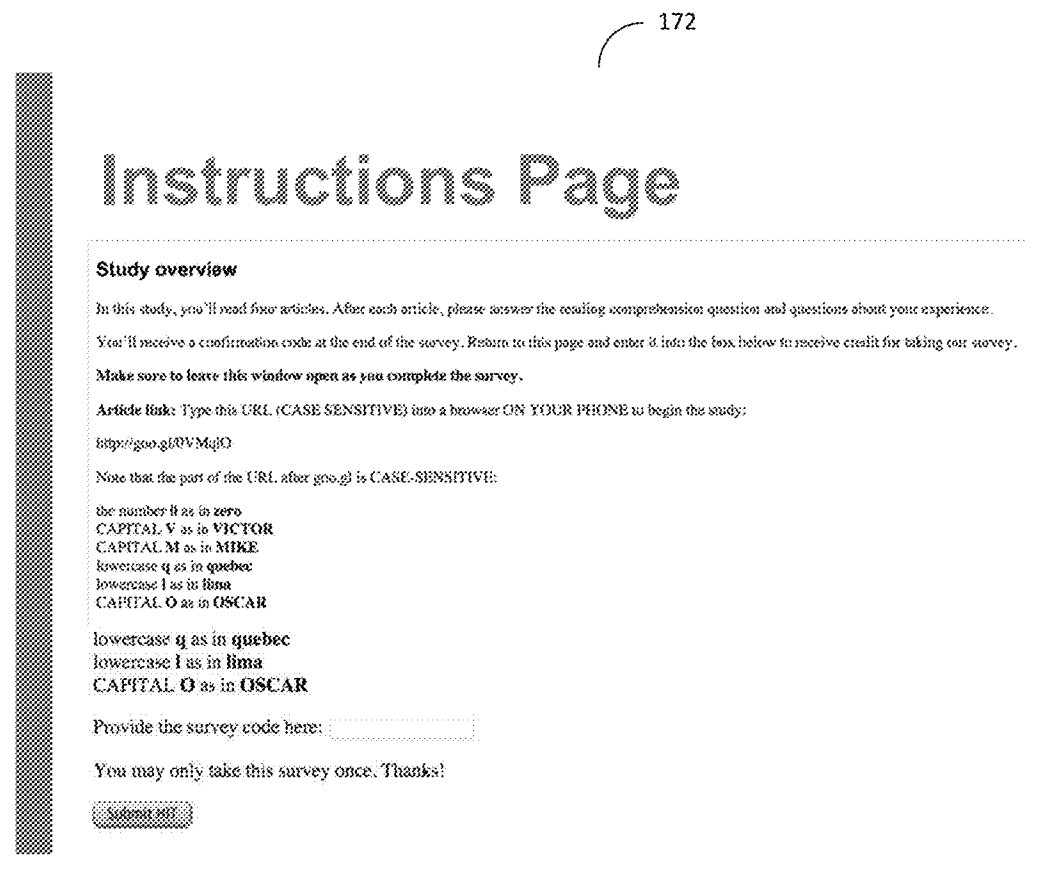

FIG. 8 depicts an implementation of an instruction page 172 of a feedback request document. In the depicted implementation, the instruction page refers to the feedback request document as a study involving reading four articles. In other implementations, the feedback request document may comprise items of content other than articles, such as videos, images, or any other appropriate item of content. In the depicted implementation, the instruction page informs a reader of the page that the study will involve reading the articles and answering both reading comprehension questions and questions about the experience. Some feedback request documents may include reading comprehension questions. This may help to ensure that a viewer is sufficiently engaged with the feedback request document to ensure a sufficient quality of response, such as a response that accurately reflects a viewer's experience with an engaged-in content experience. In the depicted implementation, the instructions refer to a confirmation code that will be provided at the end of the survey. Such a confirmation code may be used by a feedback request document participant to collect a reward for completing the feedback request document. Rewards can also be allocated to feedback request document participants who complete a feedback request document in other appropriate manners, such as by unlocking content immediately upon completion of a feedback request document, or providing gift cards usable immediately upon completion of a feedback request document.

Figure 9:

FIG. 9 depicts an implementation of a self-reported questions page 174 of the feedback request document. Self-reporting questions may be used to collect self-reported information of interest, and may be information that a feedback request document participant chooses to report, such as age, gender, location, income, or any other information. Responding to self-reporting questions may be voluntary, and may not be required for completion of the feedback request document or for collecting a reward. Self-reported information of interest may be supplemental self-reported information of interest used to supplement self-reported information of interest that is stored on, or accessible to, content experience document server 110.

FIG. 10 depicts an implementation of an introduction page 176 of the feedback request document. The introduction page of the feedback request document may follow a self-reporting questions page, and may present a brief overview of the feedback request document.

Figure 11:
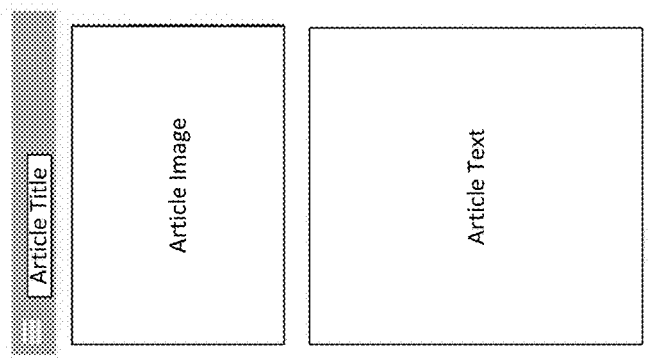

FIG. 11 depicts an implementation of a content experience document page 178 of the feedback request document. The content experience document page can comprise a content experience, and the content experience document can include first-party content and third-party content, such as an article and an ad embedded in the article, or any other type of content experience, such as those described above. The first-party content and the third-party content may be provided by a same party that provides the feedback request document—in this sense, third-party content may be viewed as simulated third-party content. Third-party content may be selected by the content experience document server 110 (shown in FIG. 1A) based on a device identifier of a device of a feedback request document participant completing the feedback request document, such as in any other the manners described above.

Figure 12:
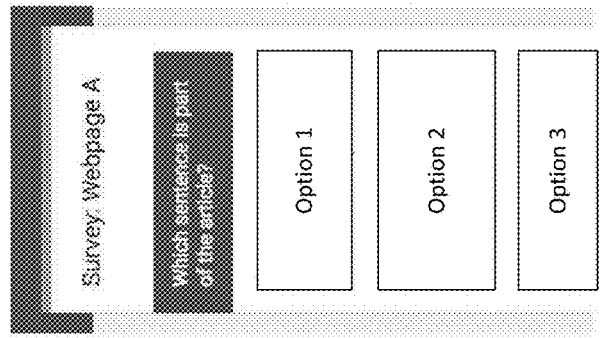

FIG. 12 depicts an implementation of a content engagement verification page 180 of the feedback request document. The content engagement verification page may include reading comprehension questions about a content experience document that may be helpful in ensuring feedback request document participant engagement with a content experience, as described above. In implementations involving non-textual content experiences, such as content experiences that comprise first-party video content, other questions may be included that can ensure the feedback request document participant was sufficiently engaged with the content experience.

Figure 13:
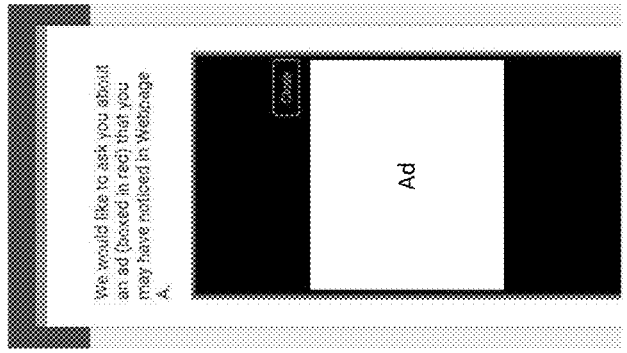

FIG. 13 depicts an implementation of a third-party content feedback page 182. The third-party content feedback page may include questions about a feedback request document participant's experience with the third-party content. The questions may include questions related to various metrics, such as annoyance, usefulness, trustworthiness, visually pleasurable, distraction, inappropriateness, or uneasiness. The feedback request document participant may be asked to assign a numerical score to the third-party experience for each metric being asked about, such as a score from 1-10, or a number of stars ratings from 1-5 stars, or any other appropriate score on any other appropriate scale. In some implementations (not depicted in FIG. 6), the feedback request document may include a first-party content specific questions page similar to a third-party content specific questions page, but with questions about the feedback request document participant's experience with first-party content rather than with third-party content. In other implementations, the feedback request document may include question pages that ask the feedback request document participant about their experience with both first-party content and third-party content.

Figure 14:
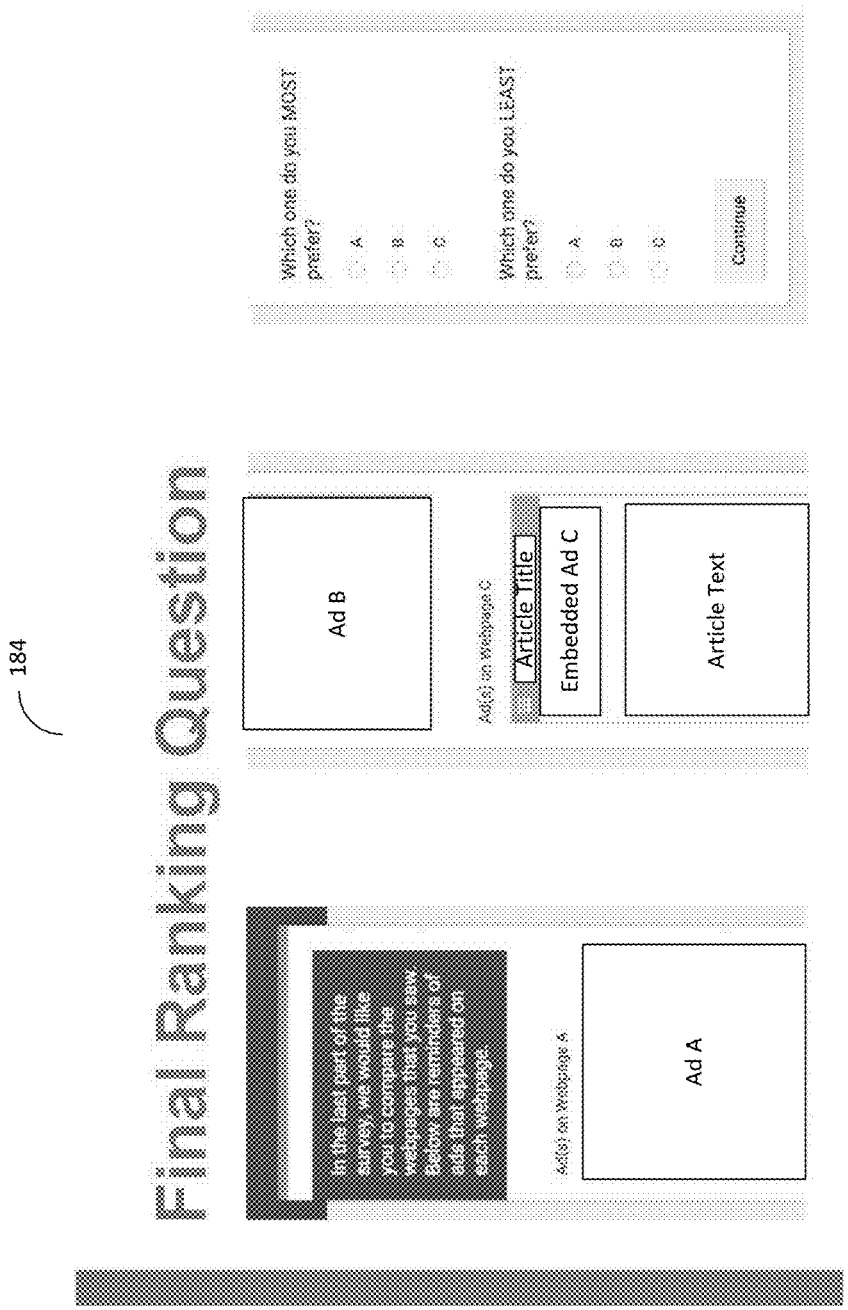

FIG. 14 depicts an implementation of a content experience document feedback page 184. The content experience document feedback page may ask the feedback request document participant to rank some of content experiences of the feedback request document, or may ask the feedback request document participant to rank some of the third-party content of the feedback request document. The content experience document feedback page can include reminders of the content experiences or third-party content being asked about. In some implementations, reminders can be snippets of the content experiences or third-party content being asked about. In other implementations, reminders may be complete reproductions of the content experiences or third-party content being asked about.

In some implementations of the content experience document feedback page, the feedback request document participant may be asked to rank the content experiences or third-party content according to a metric, such as preference, as depicted in FIG. 14, or according to any other appropriate metric. The feedback request document participant may be asked to rank content experiences or third-party content from highest to lowest, according to the metric. In some implementations, the feedback request document participant may be asked which content experiences or third-party content the participant would rank highest, and which they would rank lowest, as depicted in FIG. 14.

In one implementation, a conclusion page of a feedback request document may proceed to a final ranking question page (not shown in the Figures). The conclusion page may thank the feedback request document participant for participating, may provide information concerning collecting a reward, or may allow the feedback request document participant to invite a friend to participate in completing another feedback request document.

Although an implementation of a system for updating a ranking of CETs has been described above, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a viewer, implementations of the subject matter described in this specification can be implemented on a computer having a display device, e.g., a CRT (cathode ray tube) or LCD monitor, for displaying information to the viewer and a keyboard and a pointing device, e.g., a mouse or a trackball, by which the viewer can provide input to the computer. Other kinds of devices can be used to provide for interaction with a viewer as well; for example, feedback provided to the viewer can be any form of sensory feedback, e.g., visual feedback, auditory feedback, or tactile feedback; and input from the viewer can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of reducing computer resource utilization to update rankings based on dynamically generated content, comprising:
   identifying, by one or more servers, a ranking of content experience types of a list of content experience types including a plurality of content experience types, each content experience type including one or more parameters to generate content experience documents;
   updating, by the one or more servers, the ranking of content experience types by iteratively:
      selecting, by the one or more servers, content experience types from the ranking of content experience types to generate an update subset of the ranking of content experience types, each content experience type included in the update subset selected such that a number of content experience types ranked between the highest ranked content experience type of the update subset and the lowest ranked content experience type of the update subset is less than a predetermined update threshold, the predetermined update threshold to reduce a number of iterations for u dating the ranking of content experience types based on a number of content experience types included in the list of content experience types;
      receiving, by the one or more servers, from a client device, a request to transmit a feedback request document to evaluate rankings of the content experience types included in the update subset;
      identifying, by the one or more servers, an identifier of the client device to which to provide the feedback request document;
      generating, by the one or more servers, for the client device, the feedback request document including a plurality of content experience documents, each content experience document of the plurality of content experience documents corresponding to a different content experience type of the update subset, each content experience document generated in accordance with the parameters of the respective content experience type and using information associated with the identifier of the client device;
      transmitting, by the one or more servers to the client device, the feedback request document, the feedback request document including one or more actionable objects to receive feedback information from the client device based on the content experience documents included in the feedback request document; and
      receiving, by the one or more servers, responsive to transmitting the feedback request document, feedback information related to the plurality of content experience documents included in the feedback request document, the feedback information used to update the ranking of the content experience types included in the update subset.

2. The method of claim 1, wherein the predetermined update threshold corresponds to a percentage of the total number of content experience types in the list of content experience types.

3. The method of claim 1, wherein the predetermined update threshold corresponds to a predetermined number.

4. The method of claim 1, wherein the one or more servers perform the updating iteratively for a predetermined number of iterations.

5. The method of claim 1, wherein the one or more servers perform the updating iteratively until an update termination condition that is based on a number of content experience types whose rank changes after updating the ranking relative to a predetermined rank-change threshold is satisfied.

6. The method of claim 1, wherein the one or more servers perform the updating iteratively for a user-input number of iterations.

7. The method of claim 1, wherein the updating the ranking of content experience types is performed using Bradley-Terry analysis.

8. The method of claim 1, wherein the one or more parameters of at least one content experience type corresponds to one or more selection rules for selecting content to include in the content experience document based on online activity of the identifier of the client device.

9. The method of claim 8, wherein the feedback information includes self-reported information received from the client device and wherein the selection rules includes selecting content based on the self-reported information received from the client device.

10. The method of claim 1, wherein the feedback request document includes a content engagement verification object configured to receive an input to verify that a viewer at the client device engaged with the content experience documents included in the feedback request document.

11. A system of reducing computer resource utilization to update rankings based on dynamically generated content, the system comprising:
   a processor;
   a memory coupled to the processor, the memory storing computer-executable instructions, which when executed by the processor, cause the processor to:

identify a ranking of content experience types of a list of content experience types including a plurality of content experience types, each content experience type including one or more parameters to generate content experience documents;

update the ranking of content experience types by iteratively:

selecting content experience types from the ranking of content experience types to generate an update subset of the ranking of content experience types, each content experience type included in the update subset selected such that a number of content experience types ranked between the highest ranked content experience type of the update subset and the lowest ranked content experience type of the update subset is less than a predetermined update threshold, the predetermined update threshold to reduce a number of iterations for updating the ranking of content experience types based on a number of content experience types included in the list of content experience types;

receiving, from a client device, a request to transmit a feedback request document to evaluate rankings of the content experience types included in the update subset;

identifying, an identifier of the client device to which to provide the feedback request document;

generating, for the client device, the feedback request document including a plurality of content experience documents, each content experience document of the plurality of content experience documents corresponding to a different content experience type of the update subset, each content experience document generated in accordance with the parameters of the respective content experience type and using information associated with the identifier of the client device;

transmitting, to the client device, the feedback request document, the feedback request document including one or more actionable objects to receive feedback information from the client device based on the content experience documents included in the feedback request document; and receiving, responsive to transmitting the feedback request document, feedback information related to the plurality of content experience documents included in the feedback request document, the feedback information used to update the ranking of the content experience types included in the update subset.

12. The system of claim 11, wherein the predetermined update threshold corresponds to a percentage of the total number of content experience types in the list of content experience types.

13. The system of claim 11, wherein the predetermined update threshold corresponds to a predetermined number.

14. The system of claim 11, wherein the one or more servers perform the updating iteratively for a predetermined number of iterations.

15. The system of claim 11, wherein the one or more servers perform the updating iteratively until an update termination condition that is based on a number of content experience types whose rank changes after updating the ranking relative to a predetermined rank-change threshold is satisfied.

16. The system of claim 11, wherein the one or more servers perform the updating for a number of iterations identified via a user input.

17. The system of claim 11, wherein the updating the ranking of content experience types is performed using Bradley-Terry analysis.

18. The system of claim 11, wherein the one or more parameters of at least one content experience type corresponds to one or more selection rules for selecting content to include in the content experience document based on online activity of the identifier of the client device.

19. The system of claim 18, wherein the feedback information includes self-reported information received from the client device and wherein the selection rules includes selecting content based on the self-reported information received from the client device.

20. The system of claim 11, wherein the feedback request document includes a content engagement verification object configured to receive an input to verify that a viewer at the client device engaged with the content experience documents included in the feedback request document.

* * * * *